US007542399B2

(12) United States Patent
Wu

(10) Patent No.: US 7,542,399 B2
(45) Date of Patent: Jun. 2, 2009

(54) METHOD AND APPARATUS CAPABLE OF DETECTING SPHERICAL ABERRATION CAUSED BY A STORAGE MEDIUM

(75) Inventor: Fung-Hsu Wu, Tao-Yuan Hsien (TW)

(73) Assignee: Daxon Technology Inc., Gueishan, Tao-Yuan Hsien (TW)

( * ) Notice: Subject to any disclaimer, the term of this patent is extended or adjusted under 35 U.S.C. 154(b) by 565 days.

(21) Appl. No.: 11/278,136

(22) Filed: Mar. 30, 2006

(65) Prior Publication Data

US 2007/0121472 A1 May 31, 2007

(30) Foreign Application Priority Data

Nov. 25, 2005 (TW) .............................. 94141450 A

(51) Int. Cl.
*G11B 7/00* (2006.01)
(52) U.S. Cl. .............................. 369/112.05; 369/112.15; 369/110.02; 369/44.28
(58) Field of Classification Search ........................ None
See application file for complete search history.

(56) References Cited

U.S. PATENT DOCUMENTS

2002/0060958 A1   5/2002   Ando
2003/0058770 A1*  3/2003   Kuwahara et al. ........ 369/53.26
2004/0017742 A1   1/2004   Iwata
2004/0047271 A1*  3/2004   Mizuno ................. 369/112.24

FOREIGN PATENT DOCUMENTS

| JP | 6-162552    | 6/1994  |
| JP | 2001-351255 | 12/2001 |
| JP | 2002-163830 | 6/2002  |
| JP | 2002-202450 | 7/2002  |
| JP | 2004-14039  | 1/2004  |
| TW | 200403649   | 3/2004  |

\* cited by examiner

*Primary Examiner*—Muhammad N. Edun
(74) *Attorney, Agent, or Firm*—Winston Hsu

(57) ABSTRACT

A method capable of detecting spherical aberration caused by a storage medium includes generating a plurality of light beams having distinct phases by diffracting light emitted from a light source using a diffractive optical element, measuring optical signals of the plurality of light beams having distinct phases after being reflected by the storage medium, measuring optical signals of the plurality of light beams having distinct phases after being reflected by a reflective mirror, and updating settings of an adjusting device disposed on an optical path between the diffractive optical element and the storage medium in order to compensate for the spherical aberration caused by the storage medium.

19 Claims, 7 Drawing Sheets

METHOD AND APPARATUS CAPABLE OF DETECTING SPHERICAL ABERRATION CAUSED BY A STORAGE MEDIUM

BACKGROUND OF THE INVENTION

1. Field of the Invention

The present invention relates to a method and apparatus capable of detecting spherical aberration caused by a storage medium, and more particularly, to a method and apparatus capable of detecting and compensating spherical aberration caused by a storage medium using a diffractive optical element.

2. Description of the Prior Art

With rapid development of technology, optical systems used in large-size and high-resolution digital displays (such as projectors or projecting televisions), compact disc (CD) players, digital versatile disc (DVD) players, and the like also progress rapidly. Aberrations can downgrade the overall performance of optical systems. Therefore, it is very important to reduce aberrations in optical systems.

With increasing demands for larger storage capacity, traditional CDs and DVDs no longer satisfy user requirements. Blu-ray discs (BD) and high density digital versatile discs (HD-DVD) providing large data storage size have become future trends. The numerical apertures (NA) of object lenses used in a BD player and a HD-DVD player is 0.85 and 0.65, respectively, each of which is much larger than the 0.45 NA object lenses of a traditional CD player. Also, the BDs and the HD-DVDs have multi-layer structures and can thus provide larger storage capacity.

Certain major aberrations in an optical system are spherical aberration, coma aberration, astigmatism, curvature of field, etc. An ideal lens is theoretically capable of focusing light onto a single point. However, spherical aberration occurs when an actual lens fails to focus incident light onto a single point. Usually, the focus of a lens is designed based on the thickness of a storage medium, so that laser light can be focused onto the surface of the storage medium for data access. When the thickness of the storage medium deviates from its nominal value due to process variations or other reasons, or the storage medium has irregular thickness, spherical aberration will occur, resulting in blurred and unrecognizable images. The value SA of spherical aberration can be represented by the following formula:

$$SA \cong \lambda^*(NA)^4/\delta$$

Using a CD player as an example, $\lambda$ is the wavelength of an incident laser, NA is the numerical aperture of an optical pick-up of the CD player, and $\delta$ is the thickness variation of the disk substrate. Since BD players and HD-DVD players use object lenses having larger numerical apertures and multi-layer discs result in larger thickness variations, it is often required to design an extra adjusting device for compensating spherical aberration.

Conventionally, a relay lens set is disposed in the prior art optical systems. By adjusting two lenses of the relay lens set, spherical aberration caused by thickness variations can be compensated. In order to accurately control the relay lens set, spherical aberration error (SAE) signals corresponding to the amount of spherical aberration when an optical system is accessing a storage medium has to be measured. The prior art optical systems compensate spherical aberration on a real-time basis. By adjusting the distance between the two lenses of the relay lens set during signal measurement, a best distance between the two lenses can be obtained when the measured signal has a maximum value (with minimum spherical aberration). This prior art method is ineffective since it requires accessing data from the storage medium for the calculating the spherical aberration error signals SAE. In another prior art optical system, a polarization beam splitter (PBS) is used for splitting light reflected by the storage medium into two light beams. The spherical aberration error signals SAE can then be calculated based on focus error signals (FES) of these two light beams. Since a PBS and a sensor is required, the prior art optical system is more expensive and complicated.

SUMMARY OF THE INVENTION

The claimed invention provides an optical reading device capable of detecting spherical aberration caused by a storage medium comprising a light source for providing light to access data stored in a storage medium; a DOE disposed in an optical path between the light source and the storage medium for diffracting the light provided by the light source and thereby generating light having different phases; a PBS disposed in an optical path between the DOE and the storage medium for splitting light; a reflective mirror for reflecting light sent from the PBS; a sensor for measuring optical signals of light sent from the PBS; an adjusting device disposed in an optical path between the PBS and the storage medium for adjusting light sent from the PBS to the storage medium; and a control circuit coupled to the sensor and the adjusting device for updating settings of the adjusting device based on the optical signals measured by the sensor.

The claimed invention also provide a method of detecting spherical aberration caused by a storage medium comprising (a) generating a plurality of light beams having distinct phases by diffracting light provided by a light source using a DOE, (b) detecting optical signals of the plurality of light beams after being reflected by a storage medium, (c) detecting optical signals of the plurality of light beams after being reflected by a reflective mirror, and (d) updating settings of an adjusting device disposed in an optical path between the DOE and the storage medium based on the optical signals measured in steps (b) and (c).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
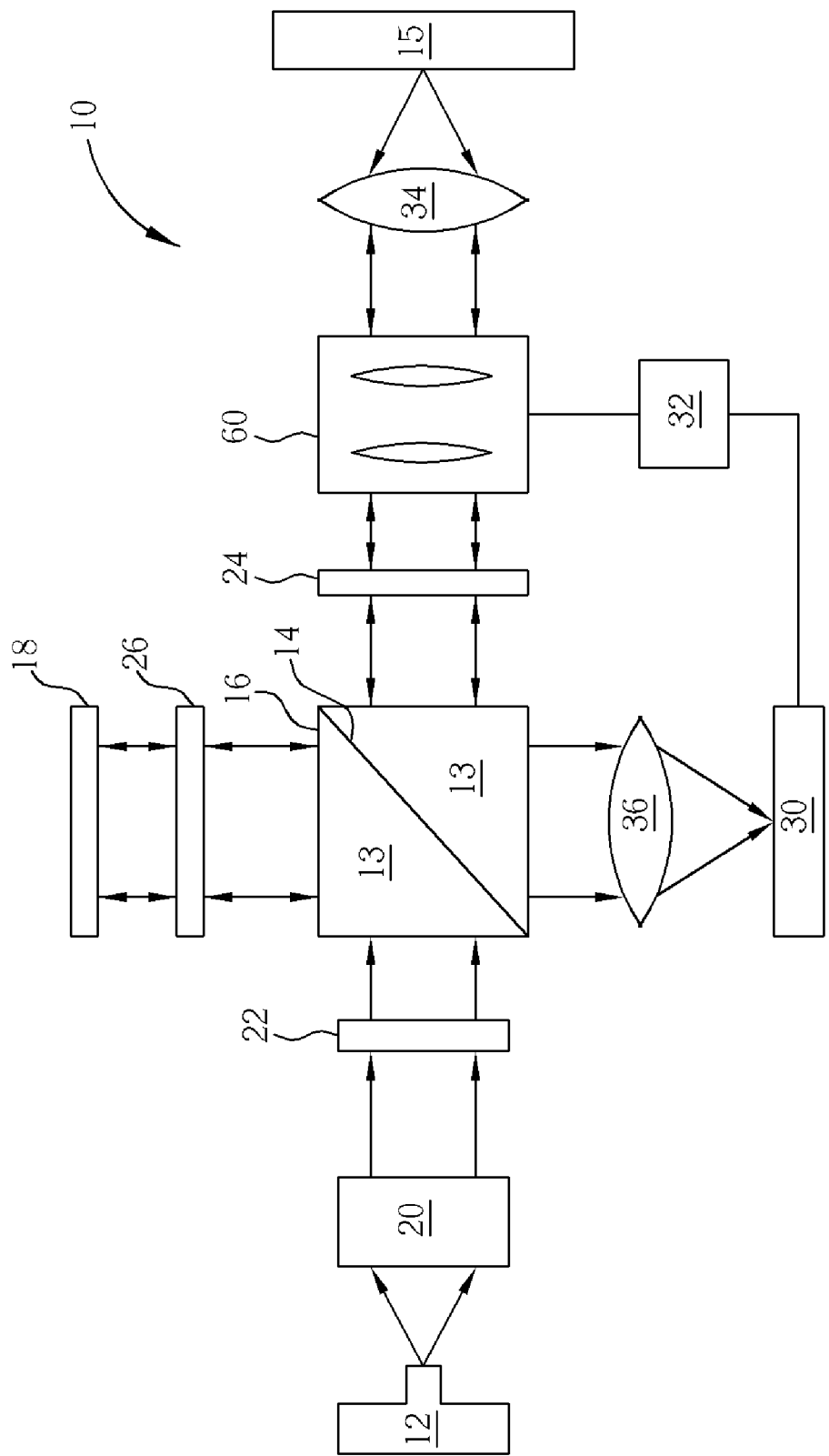
FIG. 1 is a diagram of an optical system according to the present invention.

A diagram of an optical system 10 according to the present invention is shown in FIG. 1. The optical system 10 includes a light source 12, a PBS 16, a reflective mirror 18, a beam shaper 22, quarter wavelength plates 24 and 26, a sensor 30, a control circuit 32, object lenses 34 and 36, and an adjusting device 60. The light source 12, which can be a laser diode (LD) or other light-emitting devices, emits light for accessing data stored in a storage medium 15. The beam shaper 22 is disposed in an optical path between the light source 12 and the PBS 16 for integrating the light emitted by the light source 12 onto a same optical path. The quarter wavelength plate 24 is disposed in an optical path between the PBS 16 and the storage medium 15. The quarter wavelength plate 26 is disposed in an optical path between the PBS 16 and the reflective mirror 18. The reflective mirror 18 can be a plane mirror or a diffractive optical element (DOE).

In the embodiment shown in FIG. 1, the PBS 16 has a symmetric structure and includes two right-angled lenses (two 90-45-45 degree right-angled triangular lenses) sandwiching a beam splitting coating 14. The PBS 16 can thus split the light emitted by the light source 12 into a first type of polarized light (such as a p-polarized light) which travels in a direction towards the storage medium 15 after passing the PBS 16, and a second type of polarized light (such as an s-polarized light) which travels in a direction towards the reflective mirror 18 after passing the PBS 16. Therefore, the light emitted by the light source 12 first travels through the beam shaper 22 and the DOE 20 before being split into a p-polarized light and an s-polarized light. The p-polarized light is projected onto the storage medium 15 after passing through the quarter wavelength plates 24, the adjusting device 60 and the object lens 34 sequentially. The s-polarized light is projected onto the reflective lens 18 after passing through the quarter wavelength plates 26. At the time, the light reflected by the storage medium 15 is projected onto the sensor 30 after passing through the object lens 34, the adjusting device 60 the quarter wavelength plates 24, the PBS 16 and the object lens 36. The light reflected by the reflective mirror 18 is projected onto the sensor 30 after passing through the quarter wavelength plates 26, the PBS 16 and the object lens 36 sequentially. The sensor 30 generates spherical aberration error signals SAE corresponding to the amount of spherical aberration when the optical system 10 is accessing the storage medium 15 based on received light. The SAE signals are then sent to the control circuit 32 for updating the settings of the adjusting device 60.

Figure 2:
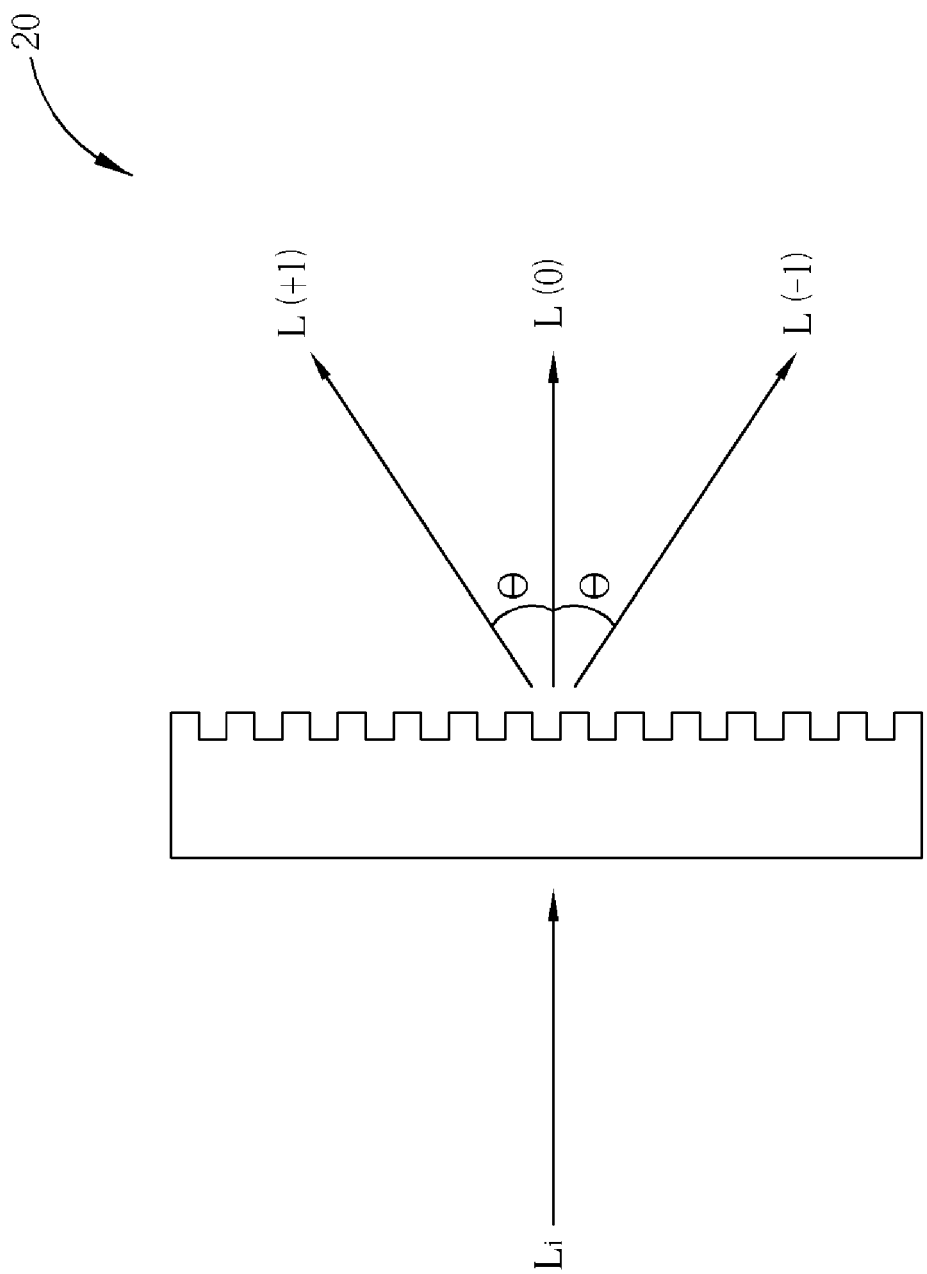
FIG. 2. is an enlarged diagram of a DOE in the optical system of FIG. 1.

An enlarged diagram of the DOE 20 is shown in FIG. 2. When an incident light Li enters the DOE 20, the DOE generates a $0^{th}$-order light beam L(0), a positive $1^{st}$-order light beam L(+1), and a negative $1^{st}$-order light beam L(−1). The $0^{th}$-order light beam L(0) is in-phase with the incident light Li, while the phase of the positive $1^{st}$-order light beam L(+1) is ahead of that of the incident light Li, and the phase of the negative $1^{st}$-order light beam L(−1) is behind that of the incident light Li. Also, the $0^{th}$-order light beam L(0) propagates in the same direction as the incident light Li, while the propagation directions of the positive $1^{st}$-order light beam L(+1) and the negative $1^{st}$-order light beam L(−1) each have a θ degree difference with respect to the incident light Li.

Figure 3:
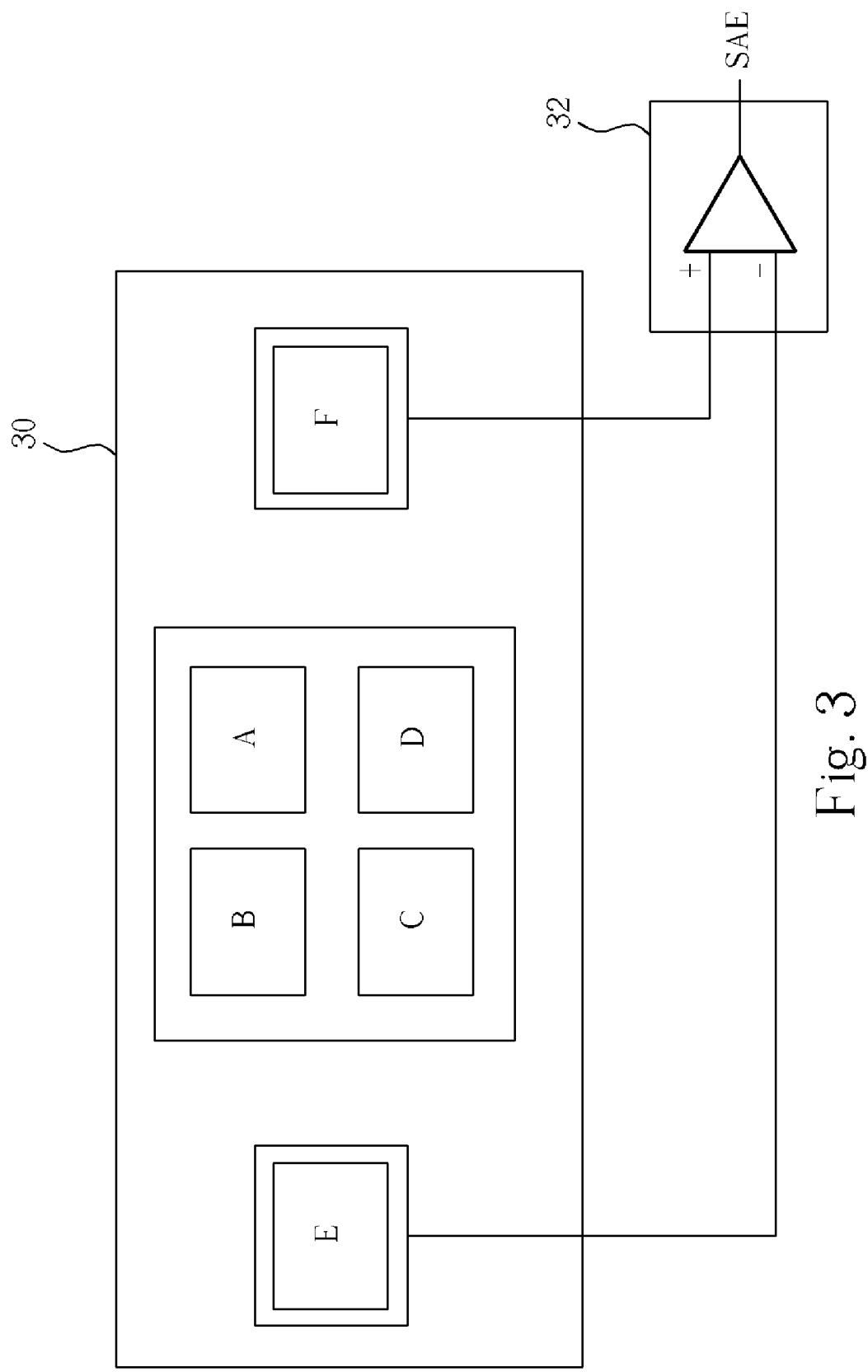
FIG. 3 is an enlarged diagram of a sensor in the optical system of FIG. 1.

An enlarged diagram of the sensor 30 is shown in FIG. 3. The sensor 30 includes sensing sections A-F. The sensing sections A-D are disposed in the middle of the sensor 30 for calculating focus error signals (FES), track error signals (TES), and radio frequency (RF) signals when the optical system 10 is accessing the storage medium 15. The sensing sections E and F are respectively disposed on the two sides of the sensing sections A-D for calculating the spherical aberration error signals SAE when the optical system 10 is accessing the storage medium 15. As shown in FIG. 2, when the light emitted by the light source 12 Li enters the DOE 20, the DOE generates a $0^{th}$-order light beam L(0), a positive $1^{st}$-order light beam L(+1), and a negative $1^{st}$-order light beam L(−1). The propagation direction of the negative $1^{st}$-order light beam L(−1) has a θ degree difference with respect to the light emitted by the light source 12. Therefore after passing through the PBS 16, the p-polarized light of the negative $1^{st}$-order light beam L(−1) is projected onto the storage medium 15 after passing through the quarter wavelength plate 24, the adjusting device 60 and the object lens 34 sequentially, and the light reflected by the storage medium 15 is then projected onto the sensing section E of the sensor 30 after passing through the object lens 34, the adjusting device 60, the quarter wavelength plate 24, the PBS 16 and the object lens 36 sequentially. Meanwhile, the s-polarized light of the negative $1^{st}$-order light beam L(−1) is projected onto the reflective mirror 18 after passing through the quarter wavelength plate 26, and the light reflected by the reflective mirror 18 is then projected onto the sensing section E of the sensor 30 after passing through the PBS 16 and the object lens 36 sequentially. Similarly, the propagation direction of the positive $1^{st}$-order light beam L(+1) has a θ degree difference with respect to the light emitted by the light source 12. Therefore after passing through the PBS 16, the p-polarized light of the positive $1^{st}$-order light beam L(+1) is projected onto the storage medium 15 after passing through the quarter wavelength plate 24, the adjusting device 60 and the object lens 34 sequentially, and the light reflected by the storage medium 15 is then projected onto the sensing section F of the sensor 30 after passing through the object lens 34, the adjusting device 60, the quarter wavelength plate 24, the PBS 16 and the object lens 36 sequentially. Meanwhile, the s-polarized light of the positive $1^{st}$-order light beam L(+1) is projected onto the reflective mirror 18 after passing through the quarter wavelength plate 26, and the light reflected by the reflective mirror 18 is then projected onto the sensing section F of the sensor 30 after passing through the PBS 16 and the object lens 36 sequentially.

Figure 4:
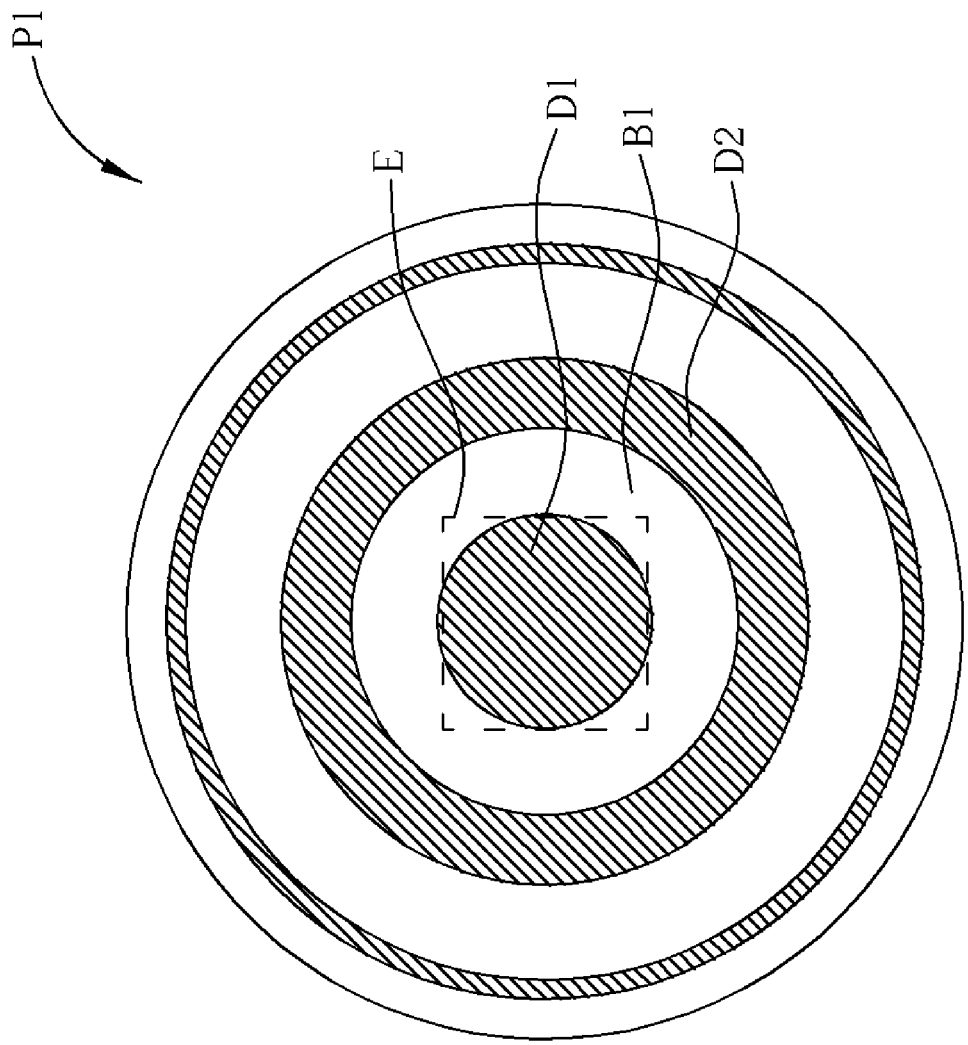
FIGS. 4 and 5 are diagrams of interference pattern.
Figure 5:
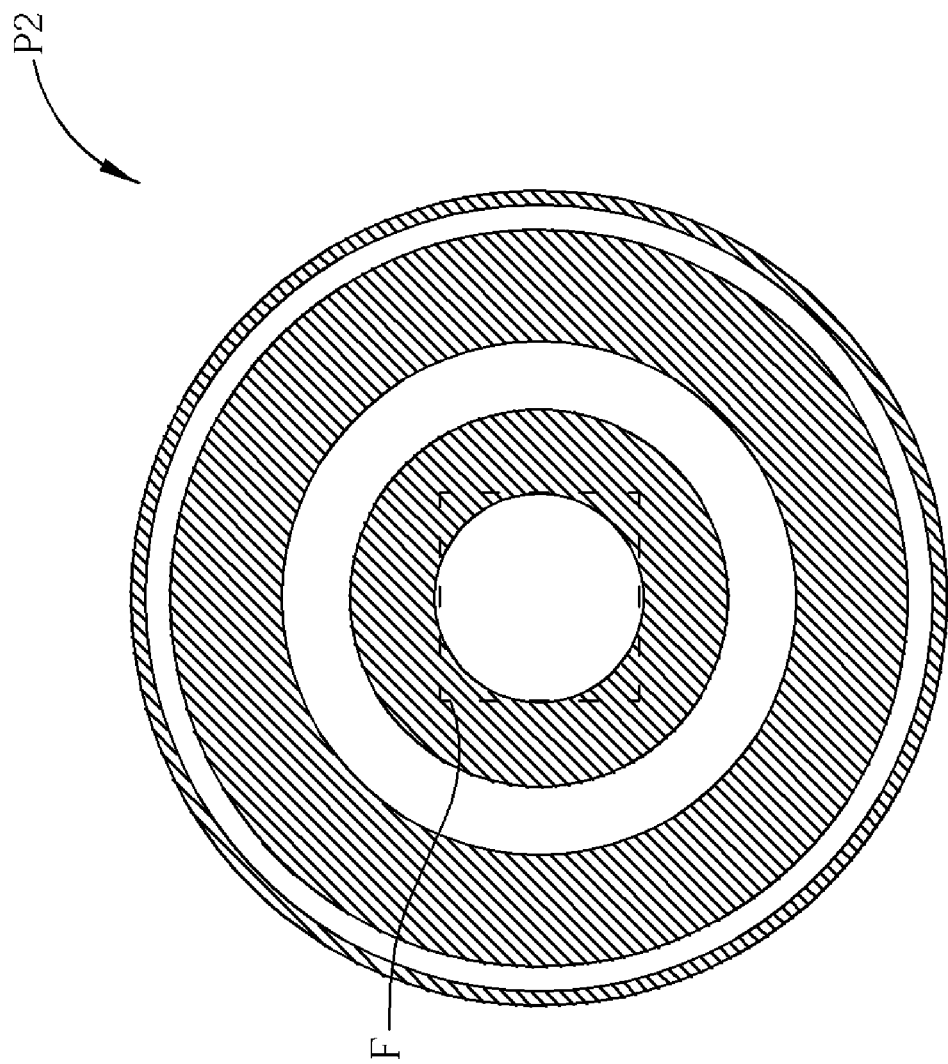

Therefore, the negative $1^{st}$-order light beam L(−1) results in an interference pattern P1 on the sensing section E of the sensor 30 after being reflected by the storage medium 15 and the reflective mirror 18, and the positive $1^{st}$-order light beam L(−1) results in an interference pattern P2 on the sensing section F of the sensor 30 after being reflected by the storage medium 15 and the reflective mirror 18. The interference patterns P1 and P2 are illustrated in FIG. 4 and FIG. 5, respectively. In FIGS. 4 and 5, dashed lines represent the boundaries of the sensing sections E and F, and hatched areas represent low-brightness regions of the interference patterns P1 and P2. Since the DOE 20 changes the phases of the positive $1^{st}$-order light beam L(+1) and the negative $1^{st}$-order light beam L(−1), the interference patterns P1 and P2 consist of bright regions (leading phase) and dark regions (lagging phase) interleaving each other. If the thickness of the storage medium 15 deviates from its nominal value, the light reflected by the storage medium 15 will have difference phases and the interference patterns P1 and P2 also vary accordingly.

For ease of explanation, blank regions represent areas that are relatively brighter than regions represented by hatched regions in the interference patterns P1 and P2 in FIGS. 4 and 5, and distinct boundaries exist between these relatively brighter and darker areas. In FIGS. 4 and 5, the interference patterns P1 and P2 are depicted in this way so that each blank/hatched region has uniform brightness and abrupt brightness changes exist between these blank/hatched regions. However in the actual interference patterns P1 and P2, the brightness at the boundaries changes gradually. For example, at the boundary of a dark area D1 and a bright area B1 of the interference pattern P1 shown in FIG. 4, the brightness of the interference pattern P1 increases gradually in a direction from the dark area D1 towards the bright area B1. Similarly, at the boundary of a dark area D2 and the bright area B1 of the interference pattern P1 shown in FIG. 4, the brightness of the interference pattern P1 decreases gradually in a direction from the bright area B1 towards the dark area D2. The way the interference patterns P1 and P2 are depicted in FIGS. 4 and 5 is only for ease of explanation.

As shown in FIG. 3, optical signals measured by the sensing sections E and F are sent to the control circuit 32. The control circuit 32 can include a comparator capable of calculating the difference between the optical signals measured by the sensing sections E and F, and thus generating the spherical aberration error signals SAE corresponding to the amount of spherical aberration caused by thickness deviations of the storage medium 15. The settings of the adjusting device 60 can therefore be updated so that the optical system 10 can access the storage medium 15 accurately.

Figure 6:
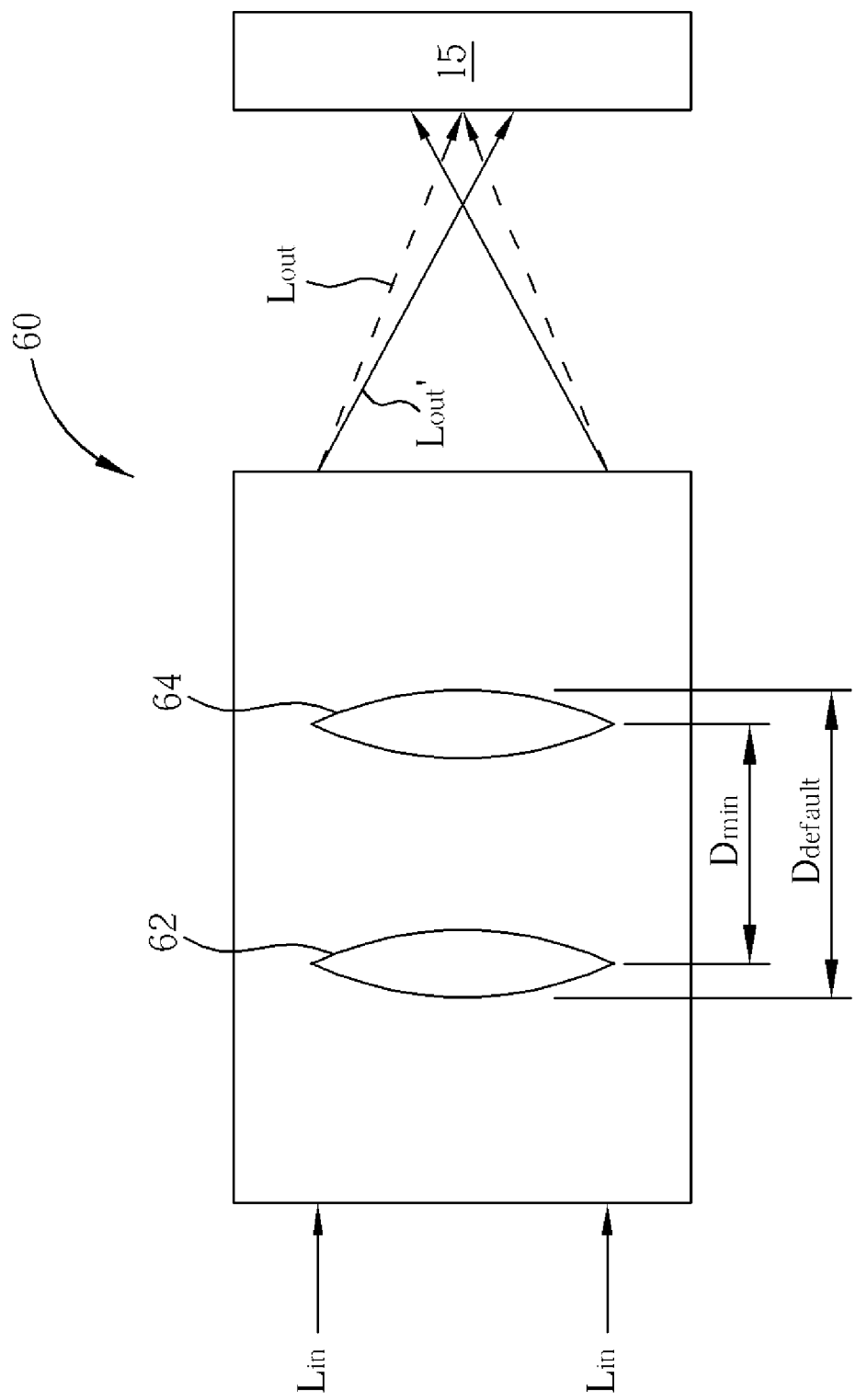
FIGS. 6 and 7 are enlarged diagrams of an adjusting device in the optical system of FIG. 1.
Figure 7:
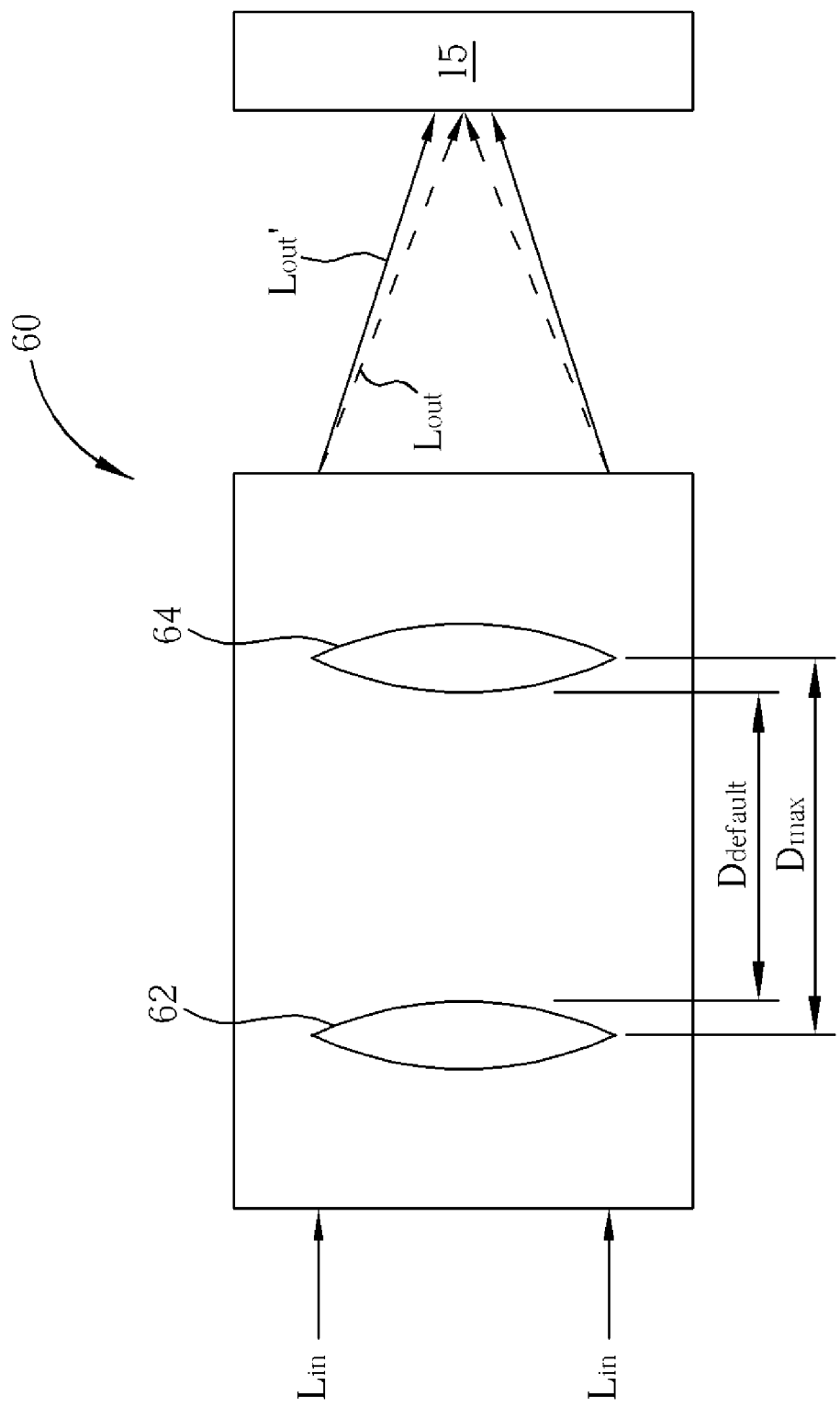

Enlarged diagrams of the adjusting device 60 are illustrated in FIGS. 6 and 7. In the embodiment shown in FIGS. 6 and 7, the adjusting device 60 includes two relay lenses 62 and 64. The distance between the relay lenses 62 and 64 is adjusted based on the spherical aberration error signals SAE for compensating spherical aberration caused by thickness deviations of the storage medium 15. Dashed lines in FIGS. 6 and 7 represent a light $L_{out}$ generated after an incident light $L_{in}$ passes through the adjusting device 60 when the distance between the relay lenses 62 and 64 is of a default value $D_{default}$. In FIG. 6, a light $L_{out}'$ is generated after the incident light $L_{in}$ passes through the adjusting device 60 when the distance between the relay lenses 62 and 64 is reduced to $D_{min}$ smaller than the default value $D_{default}$. As shown in FIG. 6, the light $L_{out}'$ has an emitting angle smaller the that of the light $L_{out}$, and its focus on the storage medium 15 is also different from that of the light $L_{out}$. Therefore, spherical aberration due to thickness deviations of the storage medium 15 can be compensated. Similarly in FIG. 7, a light $L_{out}'$ is generated after the incident light $L_{in}$ passes through the adjusting device 60 when the distance between the relay lenses 62 and 64 is increased to $D_{max}$ larger than the default value $D_{default}$. As shown in FIG. 7, the light $L_{out}'$ has an emitting angle larger than that of the light $L_{out}$, and its focus on the storage medium 15 is also different from that of the light $L_{out}$. Therefore, spherical aberration due to thickness deviations of the storage medium 15 can be compensated.

FIGS. 6 and 7 only illustrate an embodiment of the adjusting device 60 in the present invention. The adjusting device 60 can adjust the focus of light projected onto the storage medium 15 using other methods. For example, the adjusting device 60 can include a liquid crystal element whose bias voltage is changed based on the spherical aberration error signals SAE. Therefore, the refractive index of light can be changed for modifying the focus of light projected onto the storage medium 15, thereby compensating spherical aberration due to thickness deviations of the storage medium 15.

In the optical system 10 of the present invention, the DOE 20 generates light beams having distinct phases by diffracting the light provided by the light source 12. These light beams result in interference patterns on the sensor 30 after being reflected by the storage medium 15 and the reflective mirror 18. The sensor 30 measures optical signals of the interference patterns and the spherical aberration error signals SAE can thus be calculated. Based on the spherical aberration error signals SAE, the settings of the adjusting device 60 can be updated for modifying the focus of light projected on the storage medium and thereby compensating spherical aberration due to the storage medium 15.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical reading device capable of detecting spherical aberration caused by a storage medium comprising:
    a light source for providing light to access data stored in a storage medium;
    a diffractive optical element (DOE) disposed in an optical path between the light source and the storage medium for diffracting the light provided by the light source and thereby generating light having different phases;
    a polarization beam splitter (PBS) disposed in an optical path between the DOE and the storage medium for splitting light;
    a reflective mirror for reflecting light sent from the PBS;
    a sensor for receiving first light generated by the DOE and reflected by the storage medium and second light generated by the DOE and reflected by the reflective mirror via the PBS, and for measuring optical signals of the first light and the second light;
    an adjusting device disposed in an optical path between the PBS and the storage medium for adjusting light sent from the PBS to the storage medium; and
    a control circuit coupled to the sensor and the adjusting device for updating settings of the adjusting device based on the optical signals measured by the sensor.

2. The optical reading device of claim 1 further comprising a beam shaper disposed in an optical path between the DOE and the PBS for integrating the light provided by the light source into a same optical path.

3. The optical reading device of claim 1 further comprising a quarter wavelength plate disposed in an optical path between the PBS and the storage medium for adjusting phases of light projected onto the storage medium.

4. The optical reading device of claim 1 further comprising a quarter wavelength plate disposed in an optical path between the PBS and the reflective mirror for adjusting phases of light projected onto the reflective mirror.

5. The optical reading device of claim 1 further comprising an object lens disposed in an optical path between the PBS and the storage medium for focusing light sent from the PBS onto the storage medium.

6. The optical reading device of claim 1 further comprising an object lens disposed in an optical path between the PBS and the sensor for focusing light sent from the PBS onto the sensor.

7. The optical reading device of claim 1 wherein the DOE diffracts the light provided by the light source and thereby generates:
    a $0^{th}$-order light beam in-phase with the light provided by the light source;
    a positive $1^{st}$-order light beam having a phase leading that of the light provided by the light source; and
    a negative $1^{st}$-order light beam having a phase lagging that of the light provided by the light source.

8. The optical reading device of claim 1 wherein sensor comprises:
    a main sensing section for calculating focus error signals (FES), track error signals (TES), and radio frequency (RF) signals when the optical reading device is accessing the storage medium based on optical signals measured by the main sensing section;
    a first sub sensing section disposed on a first side of the main sensing section and coupled to the control circuit for detecting optical signals of patterns generated by a positive $1^{st}$-order light beam after being reflected by the storage medium and the reflective mirror; and a second sub sensing section disposed on a second side of the main sensing section and coupled to the control circuit for detecting optical signals of patterns generated by a negative $1^{st}$-order light beam after being reflected by the storage medium and the reflective mirror.

9. The optical reading device of claim 1 wherein the reflective mirror is a plane mirror.

10. The optical reading device of claim 1 wherein the reflective mirror is a DOE for adjusting a phase of light sent from the PBS.

11. The optical reading device of claim 1 wherein the adjusting device includes two relay lenses and a distance between the two relay lenses are updated based on optical signals measured by the sensor.

12. The optical reading device of claim 1 wherein the adjusting device includes a liquid crystal element and a bias voltage applied to the liquid crystal element is updated based on optical signals measured by the sensor.

13. The optical reading device of claim 1 being an optical pickup unit of a high density digital versatile disc (HD-DVD) player or a blu-ray disc (BD) player.

14. A method of detecting spherical aberration caused by a storage medium comprising:
   (a) generating a plurality of light beams having distinct phases by diffracting light provided by a light source using a DOE;
   (b) detecting optical signals of the plurality of light beams after being reflected by a storage medium;
   (c) detecting optical signals of the plurality of light beams after being reflected by a reflective mirror; and
   (d) updating settings of an adjusting device disposed in an optical path between the DOE and the storage medium based on an interference pattern of the optical signals measured in steps (b) and (c).

15. The method of claim 14 wherein generating the plurality of light beams having distinct phases is generating:
   a $0^{th}$-order light beam in-phase with the light provided by the light source;
   a positive $1^{st}$-order light beam having a phase leading that of the light provided by the light source; and
   a negative $1^{st}$-order light beam having a phase lagging that of the light provided by the light source.

16. The method of claim 15 wherein step (b) comprises detecting optical signals of the positive $1^{st}$-order light beam and the negative $1^{st}$-order light beam after being reflected by the storage medium.

17. The method of claim 15 wherein step (c) comprises detecting optical signals of the positive $1^{st}$-order light beam and the negative $1^{st}$-order light beam after being reflected by the reflective mirror.

18. The method of claim 14 wherein step (d) comprises updating a distance of two relay lenses in the adjusting device based on the optical signals measured in steps (b) and (c).

19. The method of claim 14 wherein step (d) comprises updating a bias voltage applied to a liquid crystal element in the adjusting device based on the optical signals measured in steps (b) and (c).

* * * * *